United States Patent
Soriano et al.

(10) Patent No.: US 11,928,654 B2
(45) Date of Patent: *Mar. 12, 2024

(54) APPLICATION PROGRAM INTERFACE FOR CONVERSION OF STORED VALUE CARDS

(71) Applicant: VISA INTERNATIONAL SERVICE ASSOCIATION, San Francisco, CA (US)

(72) Inventors: Edmar Soriano, Foster City, CA (US); Wesley Marangu, Foster City, CA (US); Peter Rhee, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 164 days.

This patent is subject to a terminal disclaimer.

(21) Appl. No.: 17/136,300

(22) Filed: Dec. 29, 2020

(65) Prior Publication Data

US 2021/0117941 A1    Apr. 22, 2021

Related U.S. Application Data

(63) Continuation of application No. 15/853,398, filed on Dec. 22, 2017, now Pat. No. 10,915,876.

(51) Int. Cl.
*G06Q 20/10* (2012.01)
*G06Q 20/20* (2012.01)
*G06Q 20/34* (2012.01)
*G06Q 20/36* (2012.01)

(52) U.S. Cl.
CPC ......... *G06Q 20/105* (2013.01); *G06Q 20/204* (2013.01); *G06Q 20/3433* (2013.01); *G06Q 20/3672* (2013.01)

(58) Field of Classification Search
CPC .............. G06Q 20/105; G06Q 20/204; G06Q 20/3433; G06Q 20/3672
USPC .......................................................... 705/39
See application file for complete search history.

(56) References Cited

U.S. PATENT DOCUMENTS

| | | |
|---|---|---|
| 8,285,643 B2 | 10/2012 | Isaacson |
| 8,676,704 B2 | 3/2014 | Ledbetter |
| 10,915,876 B2 | 2/2021 | Soriano |

(Continued)

OTHER PUBLICATIONS

Office Action dated Apr. 13, 2020 for U.S. Appl. No. 15/853,398 (pp. 1-21).

(Continued)

*Primary Examiner* — Hai Tran
(74) *Attorney, Agent, or Firm* — K&L Gates LLP

(57) ABSTRACT

A service uses a system of servers and specialized interfaces to facilitate transfer of value from a gift card to an open loop card of a user. The service may support user-facing interfaces that interact with customers. The service may also support an API-based interface with a gift card processor to obtain gift card value, effect the value transfer, and confirm that the gift card value has been depleted. The service may also include a programmatic interface to various transaction processor services such as associating the transferred value with a personal account number of the user, a merchant associated with the original gift card, transaction monitoring, and messaging services that provide status information to the user.

20 Claims, 6 Drawing Sheets

(56) References Cited

U.S. PATENT DOCUMENTS

| | | | | |
|---|---|---|---|---|
| 2010/0200653 A1* | 8/2010 | Wolfe | ............... | G07F 17/42 |
| | | | | 235/379 |
| 2010/0325006 A1* | 12/2010 | White | ............... | G06Q 30/0601 |
| | | | | 705/26.1 |
| 2012/0323787 A1* | 12/2012 | Nelsen | ............... | G06Q 20/351 |
| | | | | 705/44 |
| 2014/0330713 A1 | 11/2014 | Isaacson | | |
| 2015/0339645 A1* | 11/2015 | Isaacson | ............... | G06Q 30/0234 |
| | | | | 705/39 |
| 2019/0197504 A1 | 6/2019 | Soriano | | |

OTHER PUBLICATIONS

Notice of Allowance dated Oct. 7, 2020 for U.S. Appl. No. 15/853,398 (pp. 1-10).

* cited by examiner

APPLICATION PROGRAM INTERFACE FOR CONVERSION OF STORED VALUE CARDS

CROSS-REFERENCE TO RELATED APPLICATIONS

This application is a continuation application claiming priority under 35 U.S.C. § 120 to U.S. patent application Ser. No. 15/853,398, filed on Dec. 22, 2017, the entire contents of which are incorporated herein by reference.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When a person receives a gift card, either as a gift, rebate, or refund, the person must remember to carry the card, remember to use the card, and retain the card. If the card is lost or stolen, the value is irreplaceable. Often the value may be reduced over time due to fees so that even if the person eventually uses the card, it may no longer retain its full value.

Gift card fraud is high, with card bots sweeping through active card numbers, three-way call balance checks, package tampering, and card switching among the many threats.

SUMMARY

Features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

In some embodiments, a system of specially programmed servers and algorithms allows a user to convert the value on one or more gift cards to a credit associated with an open loop credit or debit card of the user. While the value may be restricted to the store or brand to which the original gift card was dedicated, the user must no longer remember to carry and use the gift card as the value is automatically applied to qualifying purchases. Further, the loss through fraud may be reduced because the value is associated with the user through his or her primary account number (PAN), not in a physical card or gift code. If the open loop card is lost or stolen, the card may be canceled and the gift card value will be associated with a newly issued card.

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Gift cards are typically issued or activated at point of sale system. For example, a customer may wish to purchase a gift card for a friend. The customer may select a card at a display of gift cards, either with a specified denomination or without. Gift cards are typically tied to a specific merchant, although some gift cards may be used at different brands associated with, for example, a number of commonly owned restaurants. At the checkout, the gift card may be scanned or swiped to activate the value of the gift card in exchange for receipt of value of the denomination. This process typically involves contacting a gift card issuer with the value amount and the card number so that future use of the card will draw down the initial denominated value of the card. The gift cards are anonymous so that the customer may give the gift card to a recipient so that the recipient can receive the benefit. If the recipient loses the card or allows its value to diminish through non-use fees, the recipient may not be able to recover the value. A person who finds a lost gift card can check the balance and use whatever value is left on the gift card. In a fraudulent case, a bot may scan likely card numbers in the hope of finding a valid card number. When a valid card number is found, the card's value may be applied to a purchase so that the value is lost to the original recipient.

A closed loop card is one in which the prepaid value can only be used at a single merchant or affiliated brand, such as a department store. An open loop card is a card whose value can used at any establishment that accepts the card network, such as Visa®. For the purpose of this disclosure, open loop cards are further defined as cards held by a user and linked to a credit or debit account.

Figure 1:
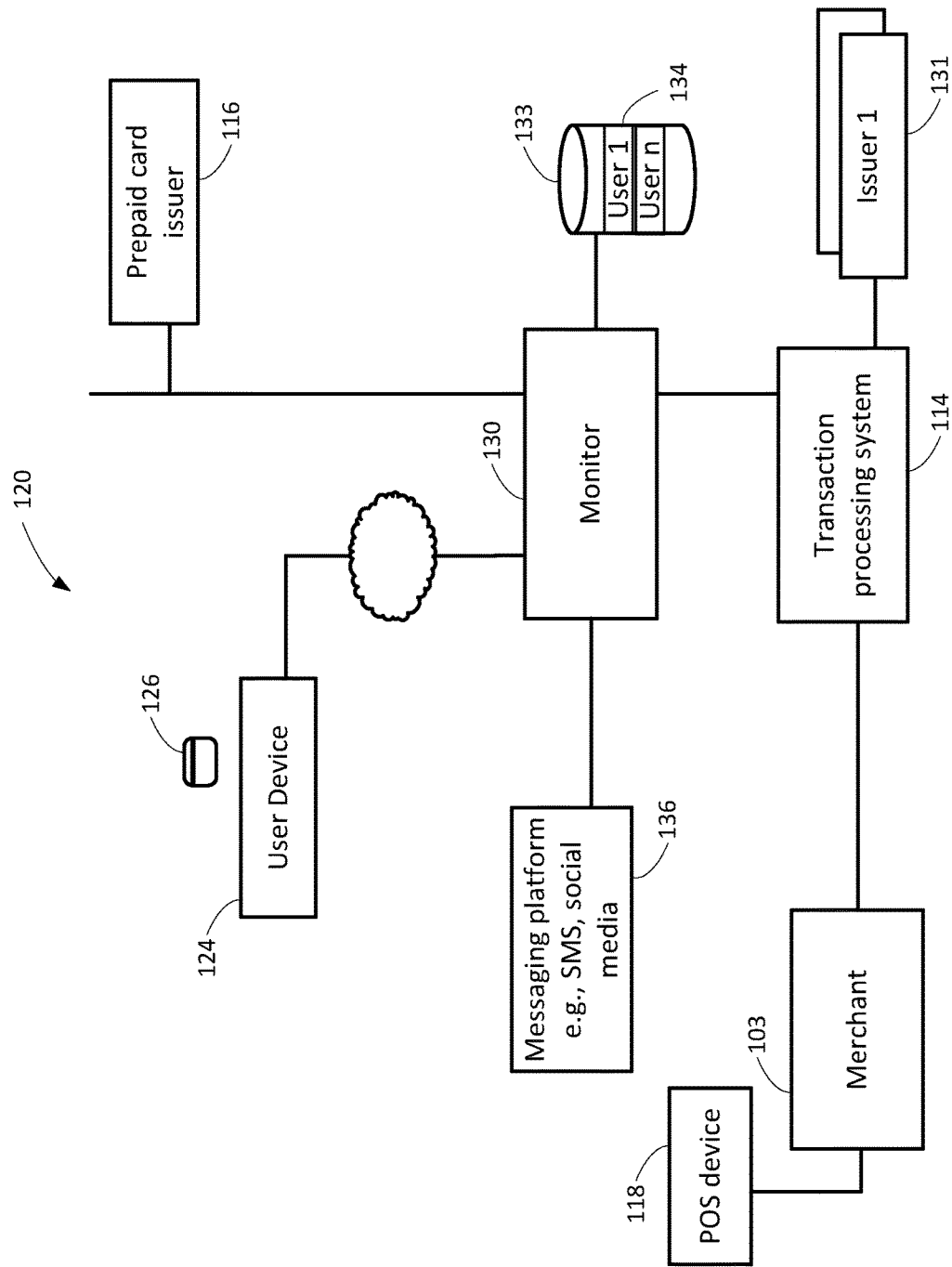
FIG. 1 illustrates a block diagram of a system for transferring gift card value to an open loop card.

FIG. 1 is a block diagram that may represent a system 120 that provides a solution to problems associated with closed loop gift cards. Additional elements of the system 120 described below may provide for conversion of gift card value, for example, value on a closed loop card to an open loop card and further, to monitor for qualifying transactions to redeem the converted value. Further, the system 120 may increase protection of merchants and consumers from fraudulent use of gift card value because the funds are associated with a customer's PAN. For example, a person attempting to fraudulently use gift card value by card number sweeping may not want his or her primary open loop card associated with the fraud because discovery of the fraud would lead directly to the offender. Further, the same person might not want to risk associating the store credit with a stolen card number because the card might be canceled at any moment.

A user device 124 may be used to interact with a monitor 130 to enter details of a gift or other closed loop stored value card 126. The card may be a physical object such as a plastic card that resembles a traditional credit card or may be a virtual card that is an electronic representation on a computing device that is capable of interfacing with the various networks in the system 120.

The monitor 130 may present a web page on the user device 124 or may support a client application on the user device 124 that allows a user to convert gift card value to his or her open loop card. In an embodiment, the user may contact a conversion website via a URL pointing to the monitor 130. In another embodiment, the user device 124 may be a smartphone allowing the user to activate an application (app) that may interact with an corresponding application hosted at the monitor 130.

A transaction processing system 114, may be an entity that manages authorization, payment, settlement, etc. flows between a merchant 103 and one or more issuers 131. The transaction processing system 114 may which may be an acquirer or a processor that receives transaction information, provides clearing and settlement services, or other transaction-related services. The transaction processing system 114 may be capable of extremely high volumes of transactions and may distributed over multiple servers and geographic locations. The issuer 131 may be an entity that issues open loop credit and/or debit cards such as a bank. The cards may be branded, e.g., with a sports team logo but may be considered open loop cards because they are accepted at a wide variety of merchants and brands, usually any merchant or service provider that accepts a particular card association, such as Visa®.

The monitor 130 may also be connected to a prepaid card issuer 116, used for this illustration to represent any entity that holds value for a stored value/gift card 126. The prepaid card issuer 116, also known as a stored value card issuer or gift card issuer, may accept payments for a card and manage the value in similar fashion to a card issuer 131 by providing authorization messages and settlement for transactions made using closed loop prepaid card value.

The merchant 103 may be any provider of goods or services that accepts card payments, such as through a point of sale (POS) device 118. The merchant 103 may connect to the transaction processing system 114 through one or more servers (not depicted) that may be part of an enterprise resource planning (ERP) system.

A messaging platform 136 may be one or more of a number of media platforms that may be used to communicate with a consumer as described more below. The monitor 130 may be configured to send messages to consumers as their closed loop/gift cards are converted to open loop card value and subsequently used to make purchases. The messaging platform 136 may include a carrier's short message service (SMS) platform, an email system, or a social media platform.

A database 133 may be attached to or incorporated within the monitor 130. The database 133 may hold records related to converted gift card value and any rules or algorithms associated with redeeming the value. The communications between the monitor 130 and the separate entities 124, 116, 136, and 114 may be over individual connections, such as secure dedicated networks, or may be carried by a common public network, such as the Internet. In the latter case, the connections, particularly those with transaction processing entities, may be secured using virtual private networks or other authenticated and encrypted services.

The communications between the monitor 130 and the separate entities 124, 116, 136, and 114 may be over individual connections, such as secure dedicated networks, or may be carried by a common public network, such as the Internet. In the latter case, the connections, particularly those with transaction processing entities, may be secured using virtual private networks or other authenticated and encrypted services. The connection to the database 133 may be a high speed local connection. In some embodiments where the monitor 130 and the database 133 are located in proximity, a dedicated fiber optic connection or similar networking apparatus may be used.

In general, a user may contact the monitor 130 to convert value of a gift card 124 to value associated with an open loop card. The monitor 130 may present a portal that allows users to convert value, specify open loop cards for associating with converted value, and for checking balances and redemption rules for converted value. Once the value is converted and any associated rules are stored, the user may begin using the open loop card for purchases. Any purchase that satisfies the rules, such as a rule requiring redemption at a particular merchant, the converted value from the gift card may be applied to the transaction. In one embodiment, the value may be applied as a statement credit while in another embodiment, the value may be applied in real time at the POS device 118 during the transaction. A message may be sent to the user confirming the conversion of value, balance information, and when transactions qualify for redemption of value.

Figure 2:
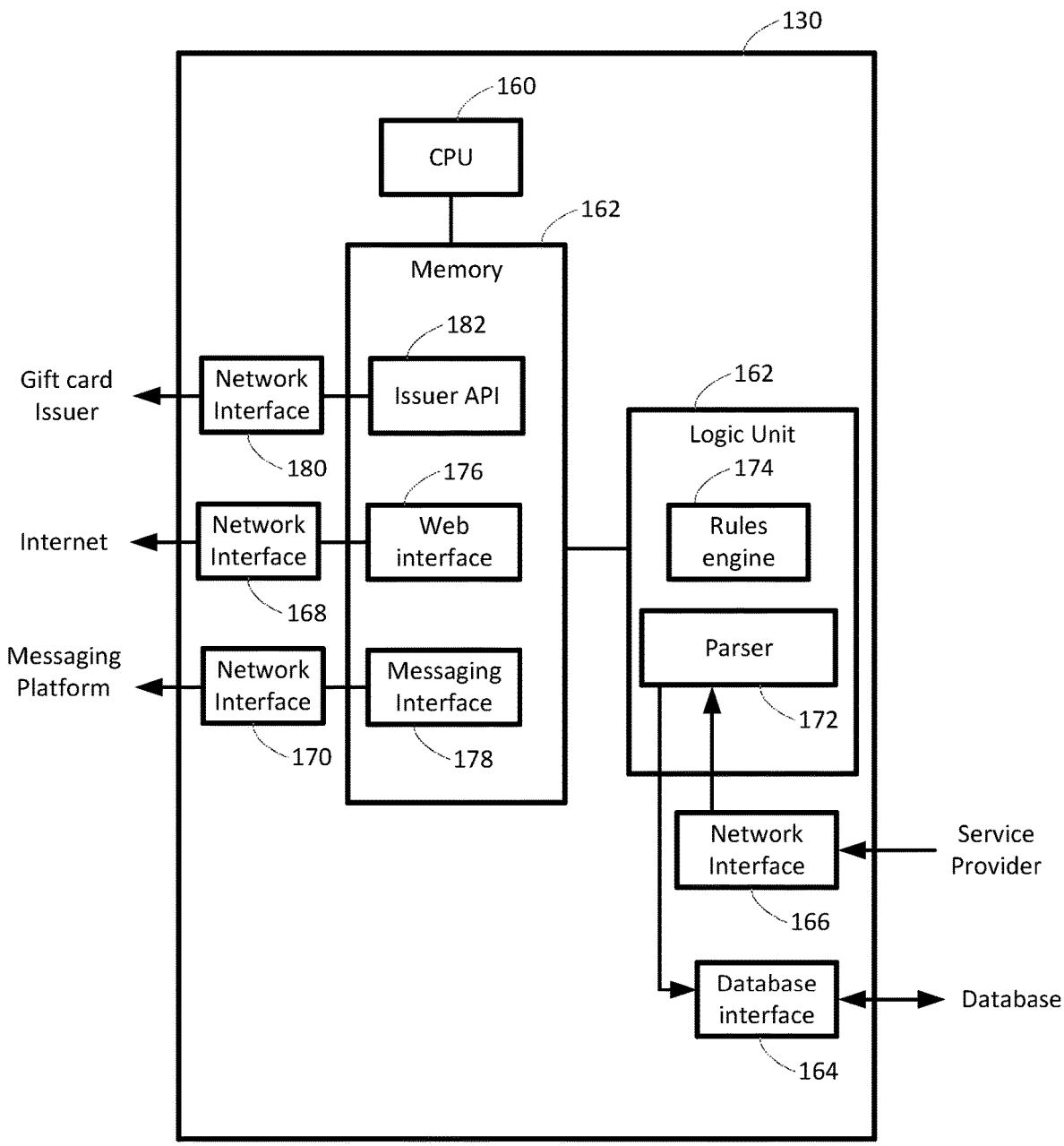
FIG. 2 is a block diagram illustrating a monitor system supporting gift card value conversion.

FIG. 2 is a block diagram representing one embodiment of the monitor 130. In this embodiment, the monitor 130 may include a central processing unit (CPU) 160, and a memory 162. The memory 162 may include static and dynamic memory, both volatile and non-volatile. The memory 162 may be a physical memory but does not include carrier wave or propagated media. The monitor 130 may include a logic unit 162 that may be a standalone unit or may implemented in software via code stored in the memory 162 and executed by the CPU 160. The monitor 130 may include a database interface 164 that handles communication with the database 133. A number of network interfaces may handle communication with the various external entities associated with the system 120, such as network interfaces 166, 168, 170, and 180 that handle connections to the transaction processing system 114, the Internet (user device 124), the messaging platform 136, and the prepaid card issuer 116, respectively. The network interfaces may handle protocol including error handling, authentication, end-to-end encryption, key generation, etc. In some embodiments, the networks may all be handled by one network interface supporting the various protocol requirements over a single network connection.

The memory 162 may include various code modules supporting an operating system and utilities (not depicted) associated with booting and operating the monitor 130. The memory 162 may also include a web interface 176 that may handle interactions with the user related to aspects of conversion of gift card value to an open loop card. For example, the web interface 176 may support a first web page that allows a user to log into the monitor 130 and/or enter a gift card number to begin the conversion process. The web interface 176 may also support subsequent web page delivery for capturing an open loop card number with which to associate the converted value, various confirmation checks from the user, and support for balance checking by the user.

A prepaid card issuer application program interface (API) 178 may connect to one or more prepaid/gift card issuers 116 via the network interface 180. The API 178 may support a RESTful interface to the card issuer 116 so that balances may be checked and valued transferred from an existing gift card to the open loop card account. The value transfer process may be viewed as a purchase transaction using the gift card where the acquirer is the monitor/service provider account 134 of the user. Rules associated with the closed loop card, such as what merchant or brand the value use is restricted to may be captured from the prepaid card issuer 116 or may be extracted from the card number.

A messaging interface 178 may communicate via a network interface 170 with one or more messaging platforms 136 associated with channels for contacting the gift card value owner. Each messaging platform, e.g., SMS, Facebook, Twitter, Instagram, etc., may support separate APIs for exposing programmatic access to the individual messaging platforms.

A logic unit 162 may support conversion of gift card value and subsequent redemption of gift card value after a qualifying purchase. The logic unit 162 may include a parser 172 and a rules engine 174. The rules engine 174 may execute rules for determining qualifying gift card conversions, e.g., that a particular gift card may be converted as well as rules for use, such as qualifying merchants and other redemption requirements. Data from the user received via the web interface 176 may be evaluated in the logic unit 162 and instructions may be generated for interactions with the gift card issuer 116 using an application program interface (API) 182. The API 182 may operate according to published specifications for efficient and reliable results. For example, a user may enter a number from a gift card 126 and a merchant name. In one embodiment, the merchant name may be selectable from a drop down list indicating merchants for which value conversion is supported. The gift card number and merchant name may be formatted into one or more messages for the prepaid card issuer 116. A first message may confirm that the card is valid and that value is still available for that card number. After confirmation by a user, another message may be generated that causes the actual transfer of value from the gift card to the designated user account.

After value is associated with a user account, for example, using an entry 134 in database 133, a parser 172 in the logic unit may screen transactions, settlement messages, and other transaction data for transactions that meet the requirements for redeeming the gift card value. The transactions may be received via a network interface 166 that receives data from a service provider such as transaction processing system 114. The parser 172 may perform this evaluation by comparing individual transactions to entries in the database 133 via, in an embodiment, a database interface 164.

Figure 3:
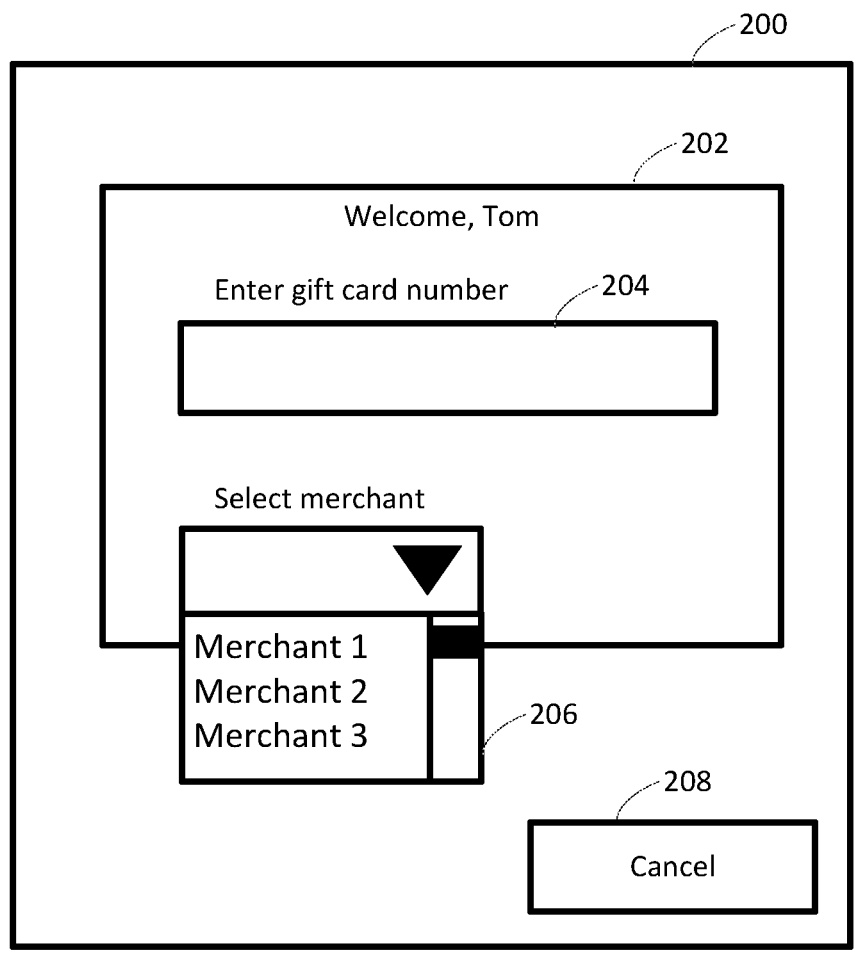
FIG. 3 is an exemplary user interface illustrating transfer of gift card value.

FIG. 3 may illustrate an exemplary user interface 200 having a first display region with a data input field 204 that may be used to enter a gift card number. In some embodiments, more than one number may be entered at time. The first display region may include a drop down entry area 206 that may be used to capture a merchant (e.g., retailer, service provider, agency, etc.) with which the gift card may be associated. In this illustration, a user may cancel the request by selecting the cancel button 208. By definition a closed loop card has usage restricted to a particular merchant. In some embodiments, the gift card number may include sufficient information for the merchant to be determined so that a separate merchant entry area may not be required. In different embodiments, the input areas may be generated responsively based on incremental data entry. In this embodiment, the user may have navigated to the web content supported by the web interface 176 and logged into the site or created a new login. In other embodiments, the user may not be required to log in until entry of a PAN for associating value. In such a case, a user may not be inconvenienced by creating an account until after determining that at least one gift card of the user's has value to convert.

Figure 4:
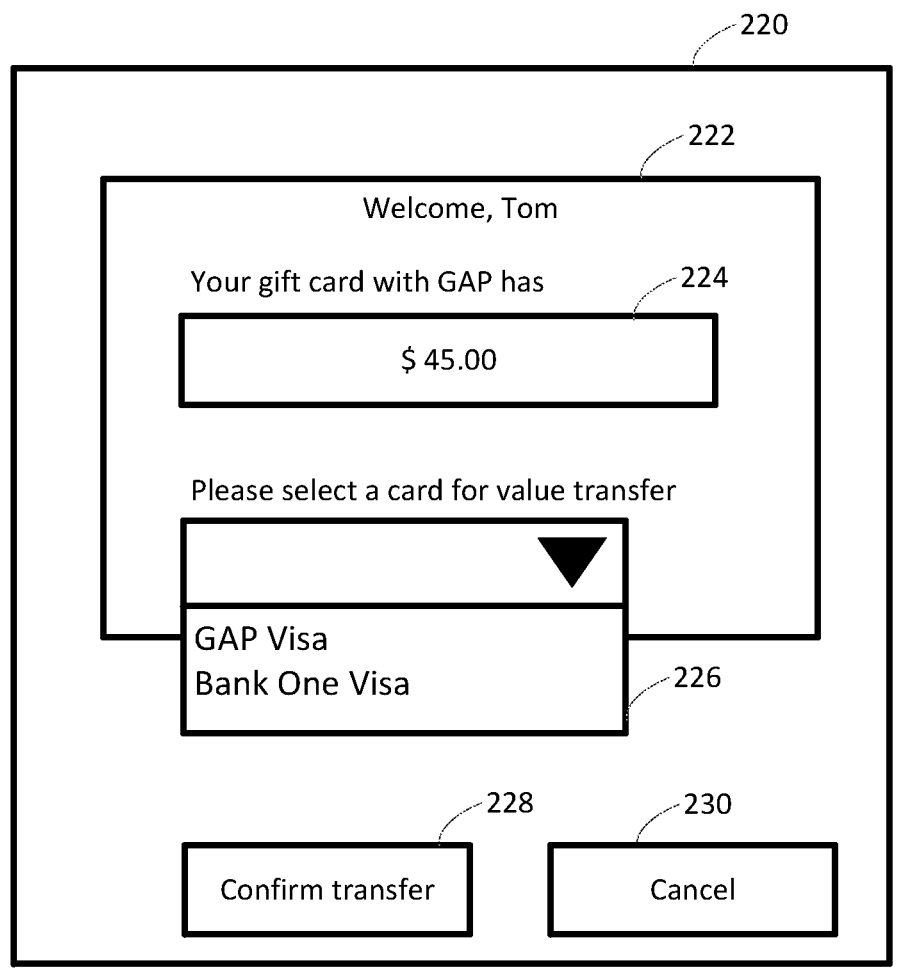
FIG. 4 is another exemplary user interface illustrating transfer of gift card value.

Another exemplary user interface 220 may be illustrated in FIG. 4. A first display region has a display area 224 that shows a value of the gift card that is available for conversion. An input area 226 may be provided to allow the user to select an open loop card with which to associate the value. In this illustration, the user may have already entered open loop cards in a pre-registration process. In other embodiments, the user may enter a personal account number (PAN) of an open loop card at the time of the gift card conversion. When the open loop card has been identified, and in some cases, verified, the user may continue the operation by selecting the confirm button 228 or may cancel the operation by selecting the cancel button 230.

Figure 5:
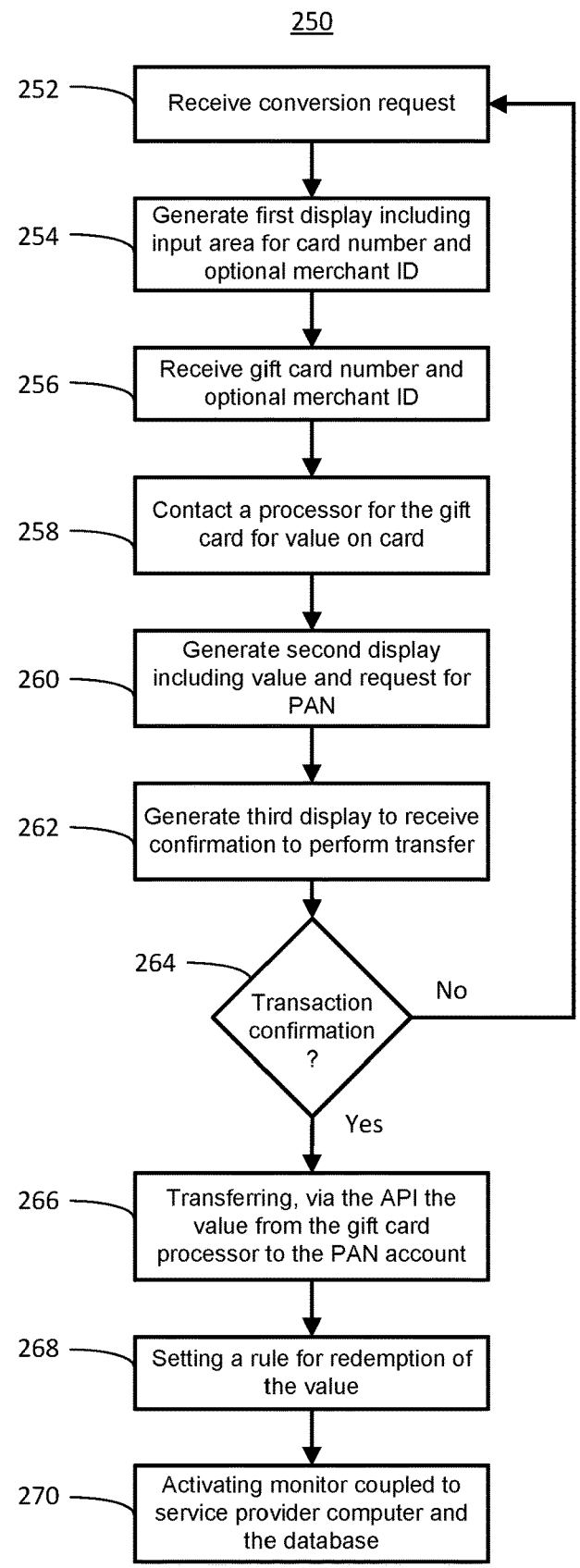
FIG. 5 is a flowchart of a method of validating and transferring gift card value to an open loop card.

FIG. 5 may be a flowchart of a method 250 of converting gift card value to an open loop card. At block 252, a conversion request may be received from a user device 124, for example, at a monitor 130. The request may cause a response to be generated at block 254, the response including generating an input area 226 for the user to enter a gift card number. In an embodiment, the response to the user device 124 may include an input capability to identify a merchant associated with the gift card 126.

At block 256, the gift card number and any other identifying data may be received at the monitor 130 and processed by a logic unit 162. The result of the processing, at block 258, may be to generate a query to the gift card issuer 116 associated with the gift card 126 and receive information related to the card's validity and any remaining value. This information may be used at block 260 to generate a second display 220 that includes the value determined from the interaction with the gift card issuer 116 and an input capability 226 for receiving an open loop card identifier, whether an actual PAN, a reference identifier, or a token representing the PAN. Optionally, the user may be give an chance to confirm the details of the transaction either by making a selection on the second display 220 or performing a confirmation step using a third input display optionally generated at block 262.

When the transaction is confirmed, the 'yes' branch from block 264 may be followed to block 266. If the user does not confirm the transaction at block 264, the transaction may be canceled and the 'no' branch followed from block 264 to block 252 where another gift card conversion may be initiated.

After confirmation, at block 266 the value may be transferred from the gift card issuer 116 to the selected open loop card. In an embodiment, this transfer may be processed as a redemption transaction performed by the monitor 130 (or monitor 130 on behalf of the transaction processing system 114 when the two are linked) so that a regular settlement transaction moves value to the monitor 130 as if the gift card 126 had been used in a purchase transaction with the monitor 130. However, instead of the monitor 130 acting as a merchant to deliver a good or service, the monitor 130 simply stores the value and makes an entry of the value amount associated with the user's PAN, such as in database 133.

The entry may also include setting rules, at block 268, that memorialize restrictions associated with the original gift card 126 such as merchant or brand at which the value can be redeemed, expiration dates, blackout dates, etc. At this point, in an embodiment, the monitor 130 may generate a final message to the user device indicating that the transfer was successful and additional information about any rules or restrictions on redemption of the value. At block 270, the monitor 130 may be activated for evaluation of transactions meeting the requirements of the rules. An embodiment for redemption processing for the PAN-associated value is covered in the flowchart of FIG. 6 discussed below.

Figure 6:
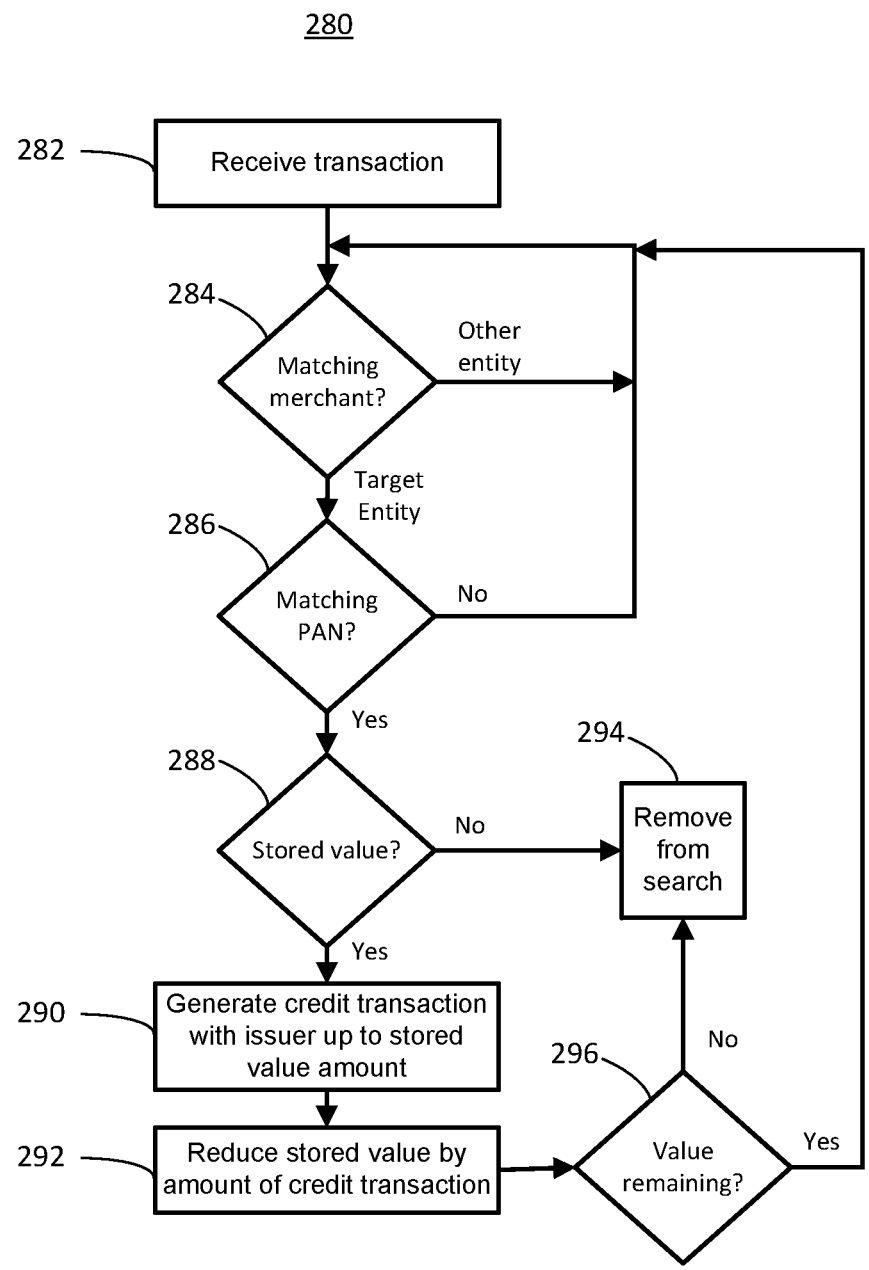
FIG. 6 is a flowchart of a method of redeeming gift card value associated with an open loop card.

FIG. 6 may be a flowchart of an exemplary method 280 of redeeming stored value associated with a PAN of an open loop card. At block 282, transactions being processed by the transaction processing system 114 may be received at the monitor 130. At block 284, the transactions may be reviewed and analyzed for content, in this case, for merchants for whom store credit has been instantiated. That is, any transaction involving a merchant that is holding value may cause the process to continue to block 286, while a merchant that does not hold store credit may cause the process to loop back to block 284 to review another transaction. At block 286, a check may be made to determine that the PAN associated with the transaction matches a PAN for which gift card value is available. If so processing may continue at block 288, if not, processing may return to block 284. Any additional filters for application of the gift card value such as, but not limited to, specific merchant brand, items purchased (e.g., not all items may be eligible for redemption of value), time of day or day of week, etc. As may be apparent, the order of steps 284 and 286 may be changed or the screening process may be implemented in a single block so that only one test is made.

A determination of availability of value may be made at block 288. At this point a check for positive value may be made including commitments on current funds not yet settled. When value exists, processing may continue at block 290. In some embodiments, the remaining value may also be communicated. When no value exists, at block 294, the account may be removed from the search space so that the PAN is no longer screened for that merchant. In addition, in some embodiments, a notification of no balance may be communicated to the user via the messaging platform 136.

At block 290, the monitor 130 may generate a credit for the PAN up to the value of either the transaction or the transferred gift card value remaining. If an amount of store credit exceeds the value of the transaction, the value may be reduced by the amount credited in the transaction. If value remains at block 296, processing may continue at block 283. In some embodiments, a notification of remaining value may be communicated to the user. If no value remains, execution may continue at block 294 and the PAN may be removed from the search space as discussed above. Similarly, in some embodiments, a notification of no value may be communicated to the user.

A technical effect may be the addition of the monitor 130 to a prior art payment processing system, including the parser 172, rules engine 174 and messaging interface 178. These capabilities may expand the functionality of the prior art system with features and functions supporting the application and use of gift card value linked to an open loop card.

The use of the system 120 benefits both merchants and customers. Merchants may be able to improve the customer experience of gift cards and other stored value while receiving other tangible benefits reduction of fraud for closed loop gift cards. Theft of gift card value may be reduced when perpetrators are faced with enrolling value with either their own card, allowing them to be tracked, or another person's card such that the value may not be accessible.

Customers may benefit by eliminating the need to remember to carry and use separate gift cards or gift codes. The customer may also reduce concerns associated with lost or stolen gift cards because the value is associated with his or her credit or debit card account, not the card itself so that even the loss of the open loop card may not result in loss of gift card value. That is, a newly issued replacement card may simply have the gift credit balance moved to the new card.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

We claim:

1. A computer-implemented method of converting gift card value to an open loop card using a customer-facing user interface of a monitor, wherein the monitor comprises a network interface, an application program interface (API) configured for communicating with an issuer processor, and a logic unit comprising a rules engine and a parser, the method comprising:
   receiving, via the network interface, a request from a user to convert a value of a gift card via the user interface;
   receiving, via the network interface, a gift card number associated with the gift card;
   sending, to the issuer processor via the API, a query message to check a validity of the gift card and a remaining value of the gift card, wherein the issuer processor is associated with an issuer of the gift card;
   receiving, from the issuer processor via the API, a response to the query message indicating the validity of the gift card and the remaining value associated with the gift card;
   receiving, via the network interface, a personal account number (PAN) of an open loop card for associating with the remaining value of the gift card;
   transferring, via the API, the remaining value of the gift card to an account associated with the PAN;
   setting, by the logic unit, a rule that restricts application of the remaining value of the gift card to a particular merchant;
   receiving, by the logic unit, a plurality of transactions;
   determining, by the logic unit, that a first transaction of the plurality of transactions is associated with the merchant;
   determining, by the logic unit, that the first transaction of the plurality of transactions is associated with the PAN;
   determining, by the logic unit, a value of the account; and
   applying, via the network interface, at least a portion of a value of the account to the first transaction.

2. The computer-implemented method of claim 1, wherein the monitor further comprises a messaging interface, the method further comprising generating, via the messaging interface, a message to the user indicating successful transfer of the remaining value from the gift card to the open loop card.

3. The computer-implemented method of claim 1, wherein the monitor further comprises a messaging interface, the method further comprising generating, via the messaging interface, a message to the user indicating application of the at least a portion of the value of the account to the first transaction.

4. The computer-implemented method of claim 1, further comprising confirming, via the API, that a value of the gift card at the issuer processor is zero after transferring the remaining value of the gift card to the account.

5. The computer-implemented method of claim 1, further comprising:
monitoring, by the logic unit, transactions using the open loop card and having the PAN to identify the first transaction; and
based on identifying the first transaction, generating a credit to the open loop card having the PAN.

6. The computer-implemented method of claim 5, wherein generating the credit comprises one of generating a credit for a value of the first transaction or generating a credit for the value of the account.

7. The computer-implemented method of claim 6, wherein the value of the account exceeds the value of the first transaction, and wherein generating the credit for the value of the first transaction comprises:
applying a portion of the value of the account equal to the value of the first transaction to the first transaction; and
subtracting the value of the first transaction from the value of the account to create an updated value of the account.

8. The computer-implemented method of claim 6, wherein the value of the first transaction exceeds the value of the account, and wherein generating the credit for the value of the account comprises:
applying the value of the account to the first transaction; and
charging a balance of the value of the first transaction to the open loop card having the PAN.

9. The computer-implemented method of claim 1, wherein the monitor further comprises a web interface, the method further comprising:
creating, by the web interface, instructions for generating a first input screen providing at least a gift card input field for entering the gift card number.

10. The computer-implemented method of claim 9, wherein generating the first input screen includes generating an input field for entering a mobile phone number.

11. The computer-implemented method of claim 9, further comprising:
generating, by the web interface, one or more second input screens providing a user card input field for the user to enter the PAN.

12. The computer-implemented method of claim 11, further comprising generating, by the web interface, a third input screen providing the user a confirmation input field for entering a confirmation to transfer the value from the gift card to the open loop card.

13. A system that converts a value on a gift card held by a user and associated with a merchant to a restricted use value on associated with an open loop card, the system comprising:
a processor;
a memory coupled to the processor, the memory storing executable instructions and a redemption rule restricting application of the restricted use value associated with the open loop card to the merchant;
a first network interface coupled to an issuer processor associated with an issuer of the gift card, the first network interface being programmed via an application program interface (API) to check a validity of the gift card and a remaining value on the gift card via a query message to the issuer processor, the first network interface being further programmed via the API to receive from the issuer processor a response to the query message indicating the validity of the gift card and the remaining value associated with the gift card;
a second network interface coupled to a public network and supplying one or more web pages for receiving a request to convert the remaining value of the gift card to the restricted use value associated with the open loop card;
the first network interface being further programmed to transfer the remaining value of the gift card to the restricted use value associated with open loop card and associate the restricted use value with a personal account number (PAN) of the open loop card;
a third network interface coupled to a transaction processing system, the third network interface programmed to receive transaction data for a plurality of transactions from the transaction processing system and to send to the transaction processing system a credit transaction based on a first transaction of the plurality of transaction being associated with the PAN and satisfying the redemption rule; and
a logic unit configured to determine, based on the transaction data, that the first transaction is associated with the PAN and satisfies the redemption rule, wherein the logic unit comprises a parser that separates transaction data into individual data elements.

14. The system of claim 13, wherein the logic unit comprises a rules engine to determine the first transaction satisfies the redemption rule.

15. The system of claim 13, further comprising a messaging interface, the messaging interface including:
an input that receives information to be communicated to the user;
a message formatter that formats the information into a channel-appropriate format; and
an output that delivers the formatted information to a user-selected messaging system.

16. The system of claim 15, wherein the second network interface further supplies a second page to the user for receiving a user selection of the messaging system.

17. The system of claim 16, wherein the messaging system is one of an SMS messaging network and a social media platform messaging system.

18. A computer-implemented method of converting gift card value to restricted open loop card value, the method comprising:
receiving, at a network interface of a monitor, a request to convert a value of a gift card;
sending, via an application program interface (API) of the monitor, a query message to an issuer processor associated with an issuer of the gift card via to check a validity of the gift card and a remaining value of the gift card, wherein the API of the monitor is between the monitor and issuer processor;
receiving at the monitor, via the API of the monitor, a response to the query message indicating the validity of the gift card and the remaining value of the gift card;
receiving, at the network interface of the monitor, a selection of an open loop card for associating with the remaining value of the gift card;
transferring the remaining value of the gift card to value in an account associated with a personal account number (PAN) of the selected open loop card;

setting, by a logic unit of the monitor, a rule restricting an application of the value in the account to one of a merchant or brand;

evaluating, by the logic unit of the monitor, all transactions using the PAN for a transaction satisfying the rule; and applying, by the logic unit of the monitor, at least a portion of the value in the account to the transaction satisfying the rule.

19. The method of claim 18, further comprising:

enrolling the PAN of the open loop card prior to transferring the remaining value of the gift card to the account associated with the PAN; and creating the account associated with the PAN prior to transferring the remaining value of the gift card.

20. The method of claim 18, further comprising:

contacting, via the API of the monitor, the issuer processor to confirm a value of the gift card is zero after transferring the remaining value of the gift card to the account associated with the PAN.

* * * * *